(12) United States Patent
Piona et al.

(10) Patent No.: US 6,394,496 B1
(45) Date of Patent: May 28, 2002

(54) MOBILE TANK LID OPENER AND RETENTION APPARATUS

(75) Inventors: Edward Piona, Acampo; Jason Ries, Lodi, both of CA (US)

(73) Assignees: ESP Mfg. Inc.; Environmental Service Products Mfg., Inc., both of Lodi, CA (US)

(*) Notice: Subject to any disclaimer, the term of this patent is extended or adjusted under 35 U.S.C. 154(b) by 0 days.

(21) Appl. No.: 09/427,059

(22) Filed: Oct. 26, 1999

(51) Int. Cl.[7] .............................................. B60D 3/22
(52) U.S. Cl. ........................................ 280/830; 220/5
(58) Field of Search ............................... 280/830, 831, 280/832, 833, 834, 835, 836, 837, 838, 839; 137/68.1; 220/1.5, 211, 212.5, 213, 315, 582, 4.12, 562; 410/68

(56) References Cited

U.S. PATENT DOCUMENTS

| | | | | |
|---|---|---|---|---|
| 4,449,724 A | * | 5/1984 | Ahn | 280/5 |
| 4,653,662 A | * | 3/1987 | Wise et al. | 220/345 |
| 4,735,457 A | * | 4/1988 | Bonerb et al. | 298/27 |
| 4,819,955 A | * | 4/1989 | Cobb | 280/837 |
| 4,895,272 A | * | 1/1990 | DeBenedittis et al. | 220/85 |
| 5,071,166 A | * | 12/1991 | Marino | 280/830 |
| 5,141,013 A | * | 8/1992 | Zink et al. | 137/68.1 |
| 5,630,625 A | * | 5/1997 | Shaw | 280/838 |
| 5,755,264 A | * | 5/1998 | Richards et al. | 137/899 |
| 5,755,351 A | * | 5/1998 | Kruzick | 220/5 |
| 5,810,309 A | * | 9/1998 | Augustine et al. | 248/313 |
| 6,068,200 A | * | 5/2000 | Kime | 239/7 |
| 6,099,070 A | * | 8/2000 | Yocum | 296/183 |
| 6,131,756 A | * | 10/2000 | Bonerb et al. | 220/1.5 |
| 6,152,457 A | * | 11/2000 | Silbernagel | 280/6.151 |
| 6,196,590 B1 | * | 3/2001 | Kim | 280/830 |

\* cited by examiner

*Primary Examiner*—Curtis A. Cohen
(74) *Attorney, Agent, or Firm*—Mark C. Jacobs

(57) ABSTRACT

An apparatus used in pairs, each formed of two components, a spring lift roller assembly, (SLRA) and a pair of spring lift lid rollers, (SLLRs) all of which are attached to a mobile tank lid. The roller assembly is mounted at about the midpoint of the depth of the lid, while one of the spring lift lid rollers is mounted at each of the distal and proximal ends along the sidewall of the lid equally spaced from the spring lift roller assembly. The apparatus's SLRA is disposed on and confined to a track and moves from a central position in the desired direction, left side or right side, for the lid raising. The lid rollers commence a ride on their own track above the SLRA's track, during the travel of the roller assembly, and when that assembly has reached its maximum travel point, the bearing plates attached to and forming part of the roller assembly rotate such that the lid now overhanging the tank's side walls, is in a position to and does rotate around the roller bearing of each roller assembly due to gravity, to open the access to the tank's content and the lid assumes a generally vertical position, having moved from an original horizontal disposition. Closing of the tank is carried out by a reversal of the process. This roll and lift motion is used for placement of material into the tank, but for dumping, the rear bottom opening or rear located side opening gate is opened by being rotated around the hinges on the end wall having such hinges, such that the total tank can be emptied upon having the front elevated or emptied while at rest in a level position by manual effort.

17 Claims, 12 Drawing Sheets

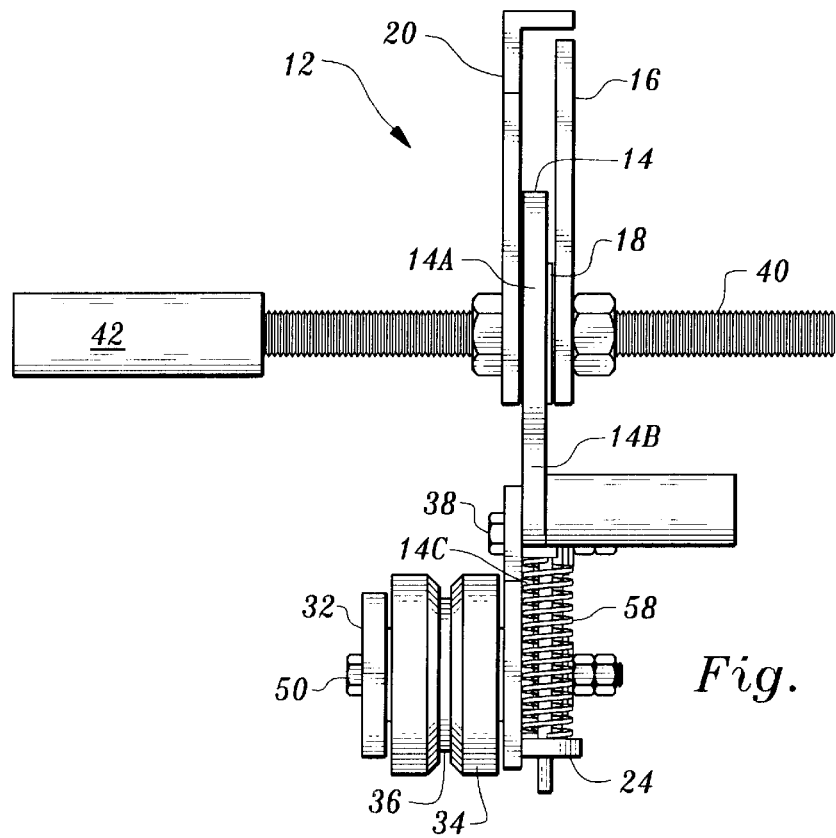
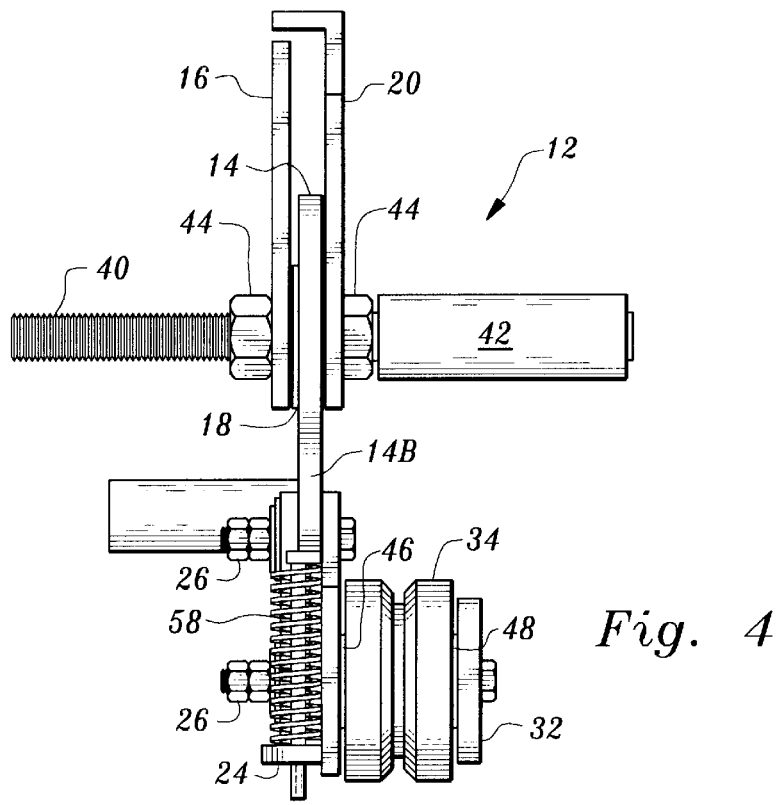

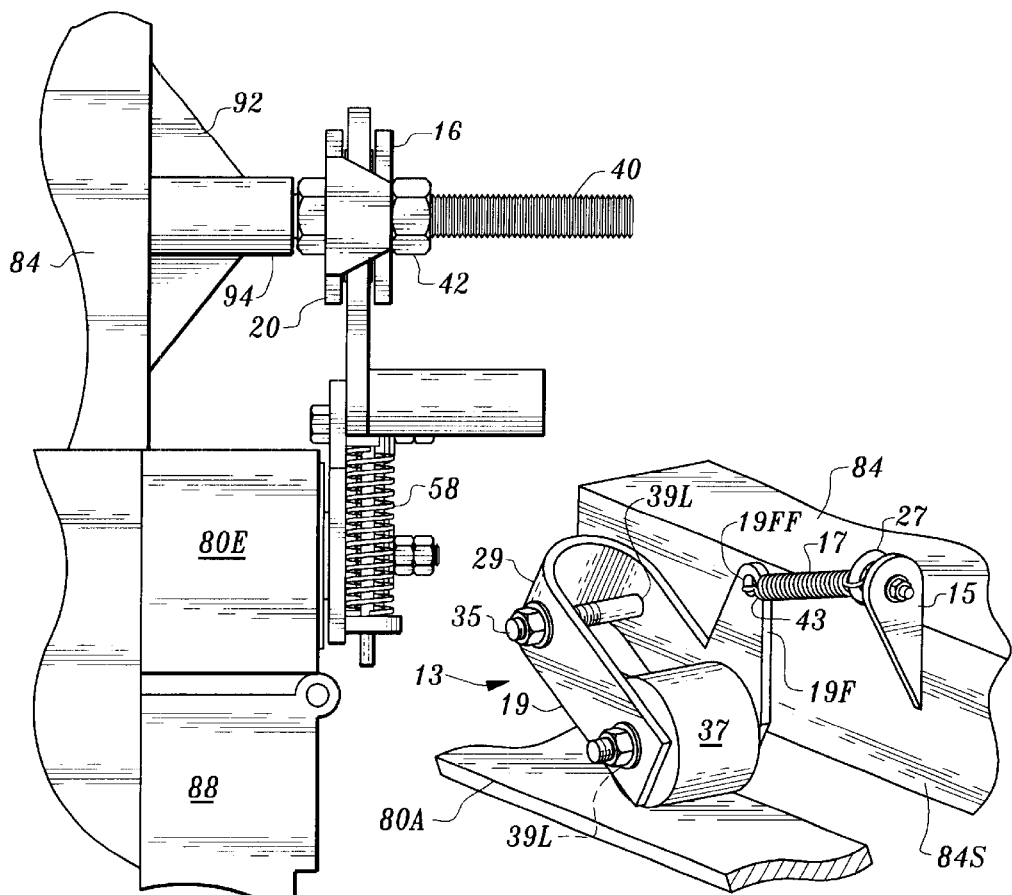
Fig. 11
Fig. 12
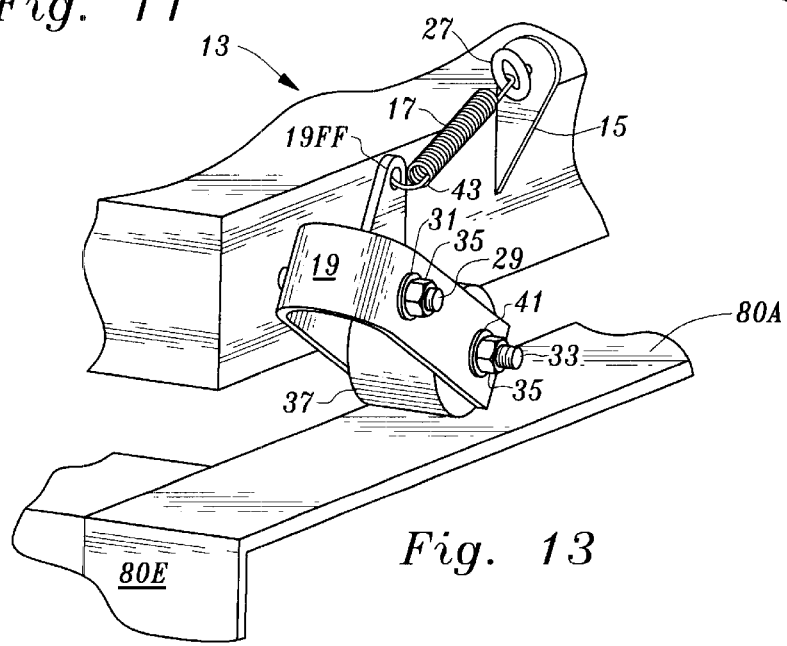
Fig. 13

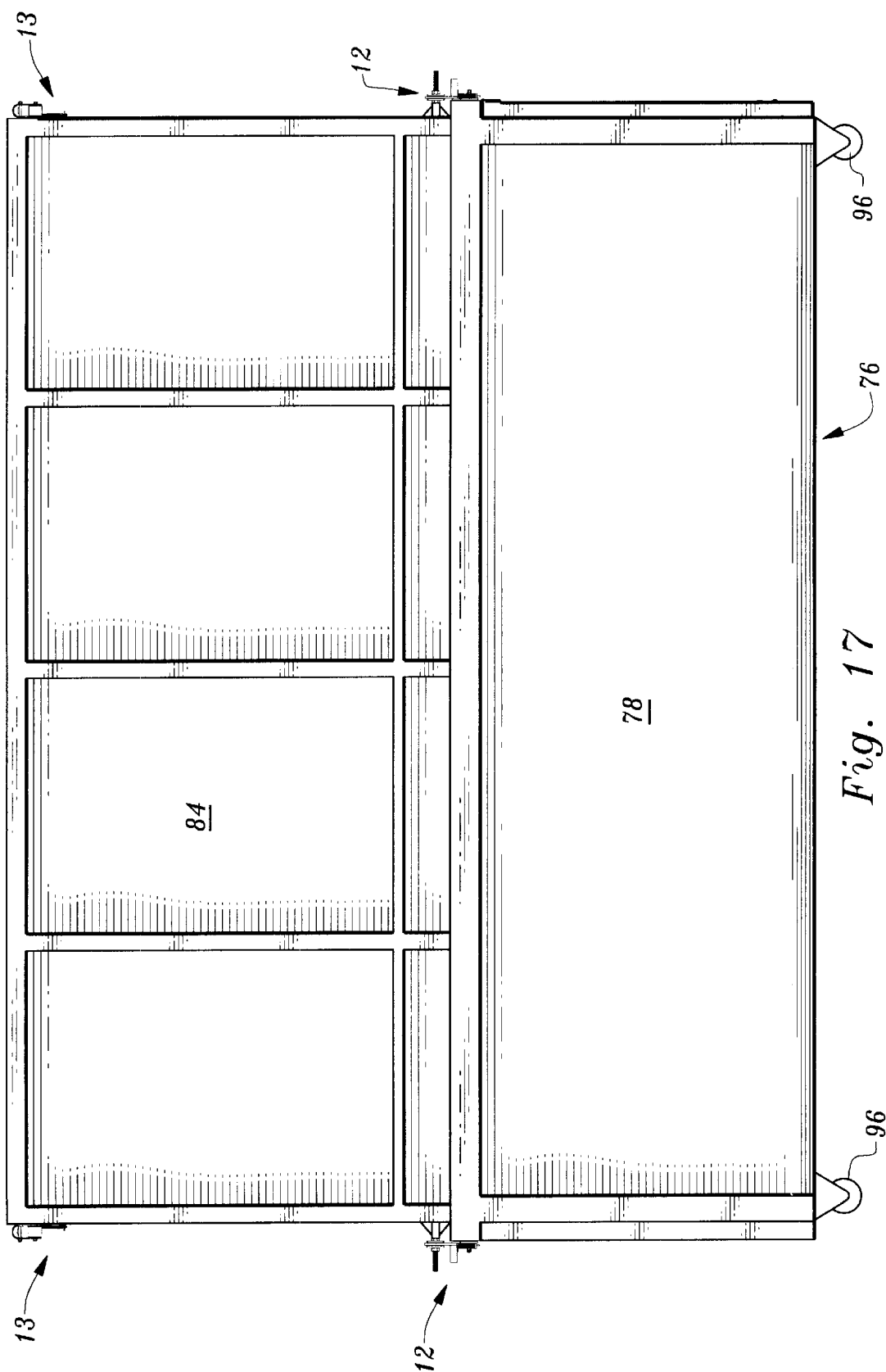

MOBILE TANK LID OPENER AND RETENTION APPARATUS

FIELD OF THE INVENTION

This invention pertains to mobile tanks and the lids that are found on them. Such tanks are used for the temporary storage and transportation of liquids or solids on the highway and under off-road conditions.

BACKGROUND OF THE INVENTION

Mobile tanks that are used to carry and transport solids or liquids, be it water or agricultural chemicals for field use, or for the carrying away of oil rig drilling mud, are often as long as 35 to 40 feet long by about 102 inches wide, —the maximum permitted under the motor vehicle code of California. These large tanks are of a top open box general configuration and have lids that alone weigh in the range of 700 pounds. As such the opening of these lids for receiving input, and for dumping or mere accessing of content can be a chore. There has been a clear need for an easy and inexpensive means for opening the lids of such large mobile tanks. The invention of this application solves that need.

It is one object therefore of this invention to provide a new lid raising and tilting apparatus for mobile tanks.

It is a second object to provide an apparatus, used in pairs, that can be manually operated to unseal mobile tank lids, and then tilt them for access or discharge.

It is a third object to provide a spring loaded lid retainer that permits easy access to the contents of the tank.

It is a fourth object to provide an apparatus that permits the lid of a tank to be easily rotated 90 degrees for total access, but within a confined or limited area.

It is another object to provide a tank lid opening means that can be operated by one person.

It is still another object to provide an apparatus and process for the rolling, tilting and rotation of the mobile tank lid to either side of the mobile tank.

It is yet another object to provide a combined rollable and tiltable mobile tank lid apparatus to permit easy discharge of the tank's contents.

Other objects of the invention will in part be obvious and will in part appear hereinafter.

The invention accordingly comprises the apparatus possessing the features properties and the relation of components, as well as the procedural steps involved, which are exemplified in the following detailed disclosure and the scope of the application of which will be indicated in the appended claims.

For a fuller understanding of the nature and objects of the invention reference should be made to the following detailed description, taken in conjunction with the accompanying drawings.

BRIEF DESCRIPTION OF THE FIGURES

FIG. 3 is a left side elevational view of the first component of the invention, prior to installation.

FIG. 4 is a right side elevational view of the uninstalled first component.

FIG. 11 is an end view of the first component of the apparatus of FIG. 2.

FIG. 12 is a right side perspective of the second portion of the apparatus of this invention.

FIG. 13 is a left side elevational view of the portion seen in FIG. 12.

FIG. 17 is a side elevation of a mobile tank's raised lid being retained by the apparatus of this invention.

SUMMARY OF THE INVENTION

Figure 1:
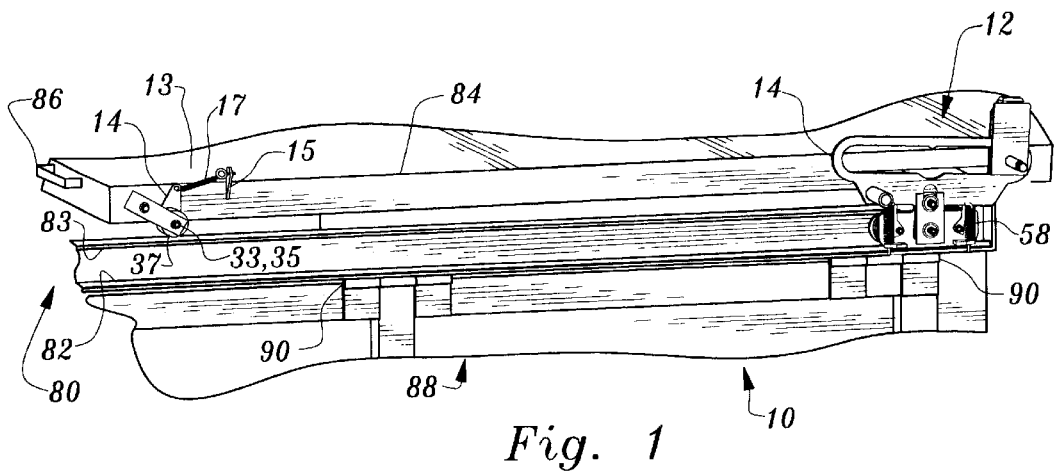
FIG. 1 is a left perspective end view of the tank lid opening and retention apparatus of this invention showing both portions of the apparatus.

An apparatus formed of two components, both of which are at opposite ends of a mobile tank for the linear movement of a top open box configuration mobile tank's lid and the subsequent 90 degree tilt thereof to either the left or right side of the tank. A pair of spring lift roller assemblies each attached to the tank lid, ride on the upper track of a dual track system, for the depth of the tank on opposite sides of the tank. Each spring lift roller assembly, operates in conjunction with an opposed pair of spring lift lid rollers, which also roll on a track disposed between the front and the back of the mobile tank. Inner and outer bearing plates are interconnected and together ride in a slot of the spring lift roller assembly (SLRA). These plates are in turn mounted to the lid for rotation on a roller bearing disposed between the inner and outer roller bearing plates. When the pair of bearing plates reach their maximum travel distance within the slot of the SLRA, the lid pivots over the tank's front or rear wall to about a 90 degree angle to thereby provide access to the tank's content. Closure involves a reversing operation.

DESCRIPTION OF THE PREFERRED EMBODIMENT

The apparatus 10, of this invention comprises two components; a spring lift roller assembly hereinafter designated SLRA, 12, used in conjunction with a pair of opposed spaced spring lift lid rollers, 13, hereinafter designated SLLR. Two apparatuses are required for the movement and opening of a lid of a mobile or other tank. One apparatus is mounted on each end of such a tank which are generally of a rectangular horizontal cross section.

Tanks, of a mobile nature, for which the opening of lids is desired, utilizing the apparatus of this invention are depicted in whole or in part in such figures as 15, 17 and 19 and are noted as designator 76. Typically these tanks 76 are rectangular, and have two sides 78 and two ends 88, a bottom, not seen, a moveable lid 84, seen in FIGS. 1,18 and 19, and often 4 wheels or rollers 96, one per corner, for movement. See also FIG. 14.

Figure 19:
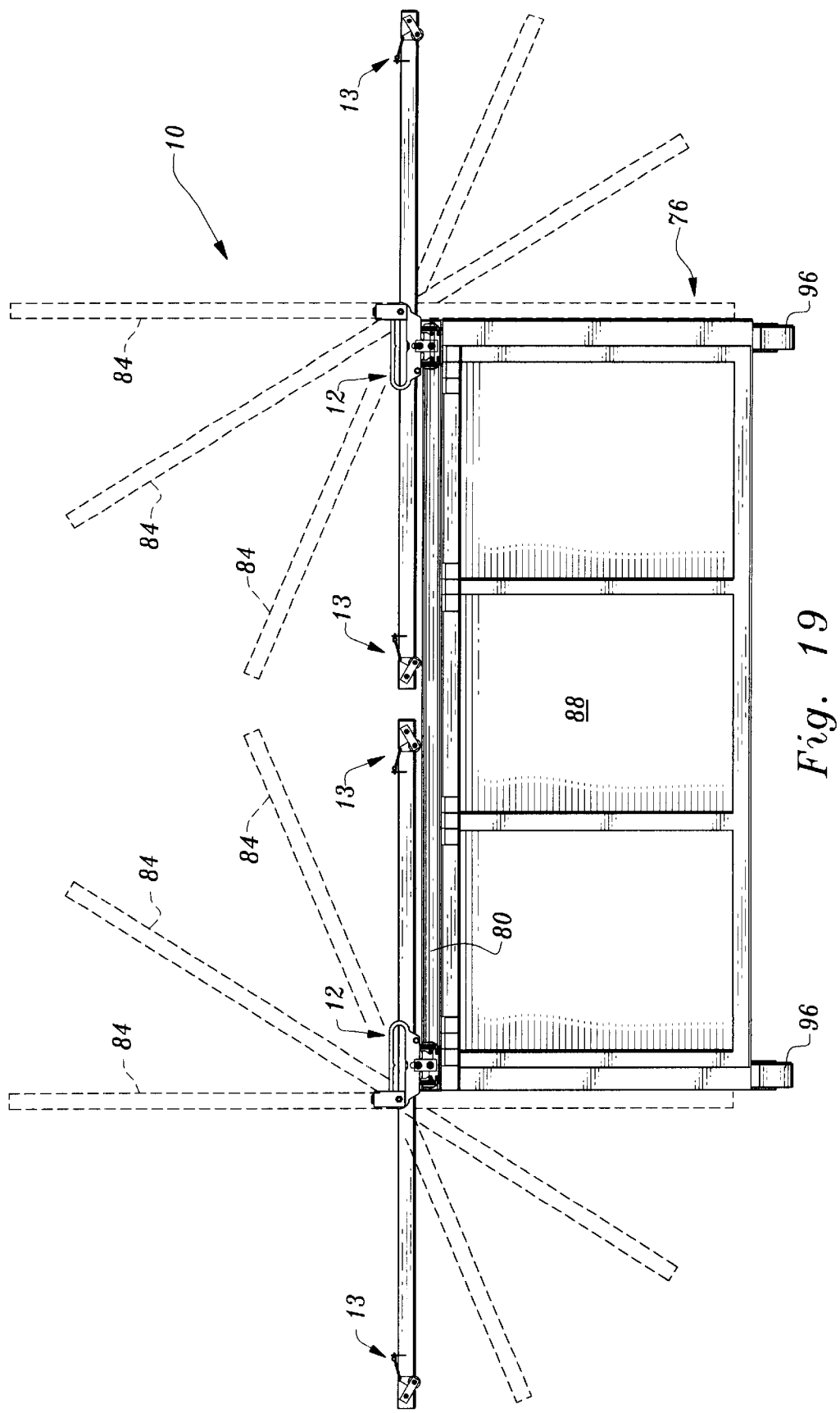
FIG. 19 is a time-motion view showing the paths of travel that can be had from the opening of the mobile tank lid of this tank, when the lid moves to either the right or left, i.e., to the left or right side of the tank.

The apparatus of this invention is used in pairs, to relocate the lid 84 of a tank such that access can be gained to the interior of the tank or container 76 for further addition to the contents therein. (It should be noted that while the contents are loaded through the top they are dumped through the tailgate at the rear of the tank. The actual time sequence and pattern of movement is shown in FIG. 19, and discussion thereon is set forth infra.

Reference is made to FIG. 1 wherein the first component 12, the SLRA is seen disposed at one end of a channel like dual track system 80 connected to lid 84. Lid 84 is seen to be in a general horizontal disposition, overhanging the side wall of the tank. One SLLR 13, can be seen but the second opposed one is hidden from view in this figure. Note the presence of the handgrip 86 on the side edge of the lid 84 for use by a workman. Hinges 90 disposed beneath the track, ie. interposed between the track and the tank allow the tailgate to hinge for quick unloading of the contents of the tank.

Figure 2:
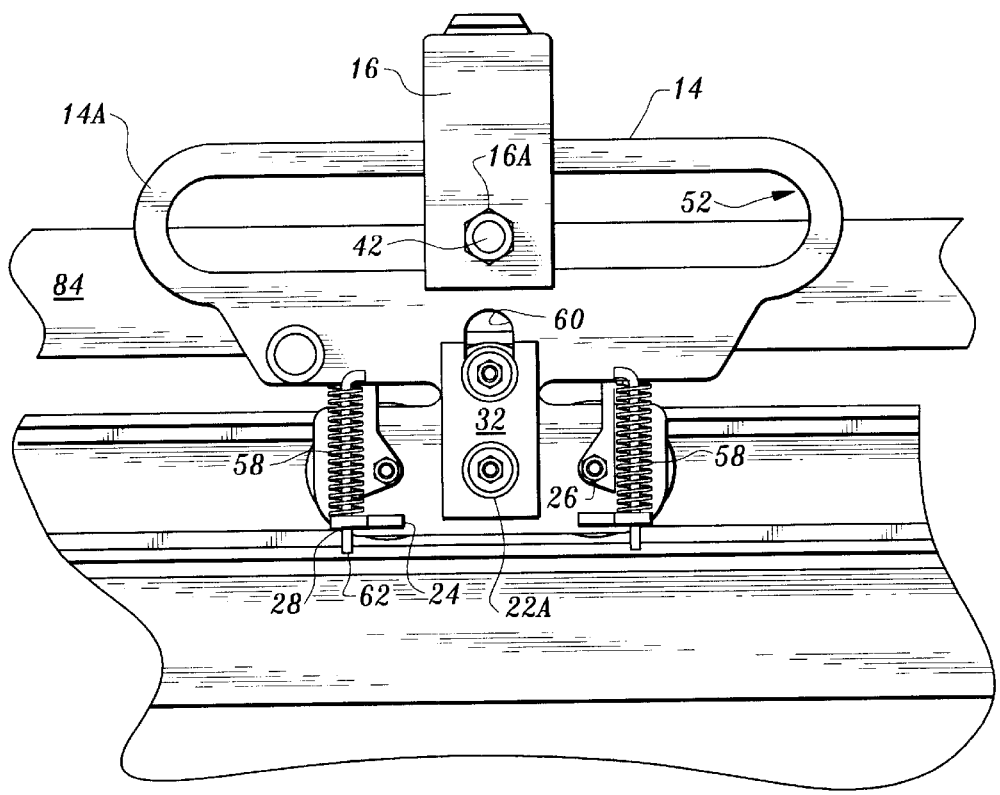
FIG. 2 is a front elevational view of one portion of the apparatus attached to a tank lid.
Figures 5, 6:
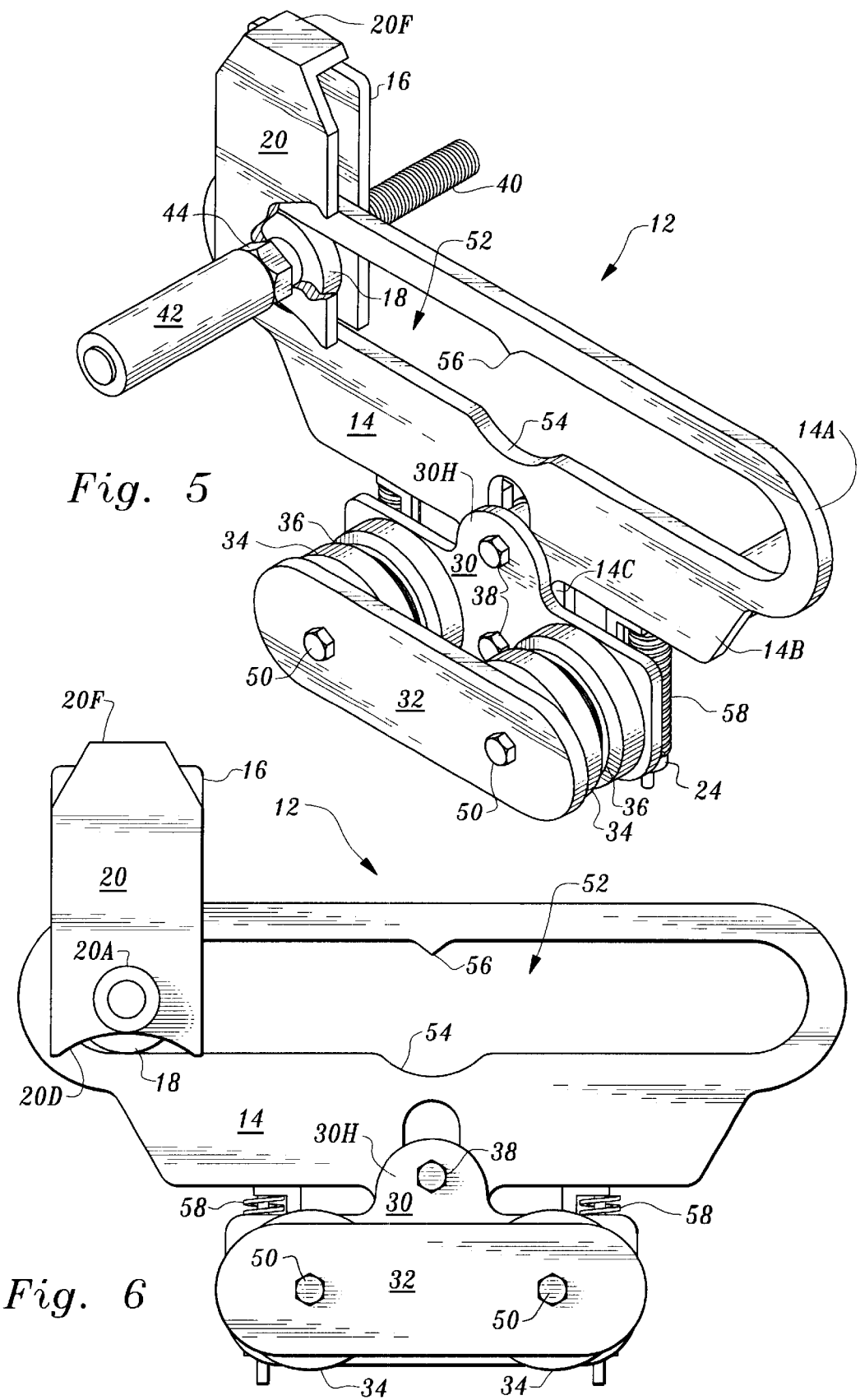
FIG. 5 is a left side perspective view of the first component with one element shown partially cut away.
FIG. 6 is an interior elevational view of the component of FIG. 2, which forms one portion of the apparatus of this invention.
Figure 7:
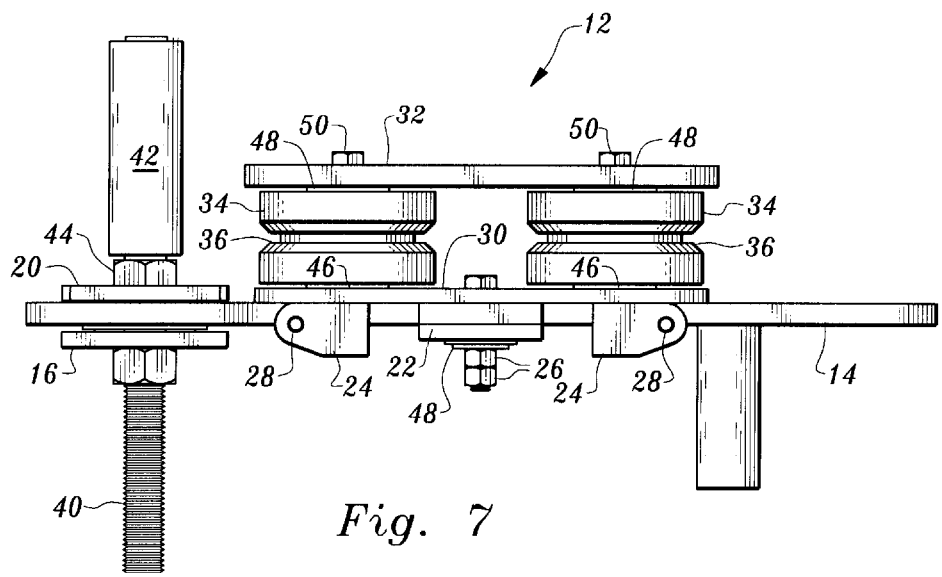
FIG. 7 is a bottom plan view of this component.

The discussion now moves to the SLRA 12 seen in front elevation in FIG. 2, and seen in front and rear elevation in FIGS. 3 and 4, and in rear perspective in FIG. 5 and top perspective in FIG. 7. The SLRA 12 main element is the elongated main roller plate 14, which has three integrated sections of the same thickness but different lengths. The sections are 14A, the upper; 14B, the middle and 14C the lower section. Reference is made particularly to FIGS. 3 and 4. Section 14A, is a racetrack shape section of the longest dimension, and which has a slot 52 therein. Section 14B is a solid plate of slightly less extension and which has therein part of a vertical central slot, 60 for the receipt and passage of the vertically spaced mounting bearing bolts 38, each of which bolts has a bearing 43 thereon, (see FIG. 8) and which bolts are seen best in FIGS. 5 and 6. These bearings though not seen permit unencumbered vertical movement of the main bearing plate 14 between the spacer plate 22 and the inner roller track plate 30.

The third section is a vertically directed central section 14C, FIG. 3 and 4. This third section is integral to the second section and contains the lower part of the rounded end vertical slot 60. The upper end of the rounded end vertical slot 60 can be seen in FIG. 8. The third section 14C of the main roller plate 14, has a preferably arcuate lower end.

A pair of bearing plates, the outer bearing plate 16 and the inner bearing plate 20 are spaced horizontally from each other by a bearing, 18 per FIG. 4, and each of said bearing plates is disposed on the exterior opposite face of the SLRA 14. The spacer plate 22 as seen also in FIG. 8, includes a lower central bore and an upper cradle recess in which are disposed the bearing carrying bearing bolts 38.

A threaded shaft 40 passes through aligned unnumbered throughbores in each roller plate, per FIG. 3. A pair of nuts 44, per FIG. 4 are mounted on the threaded shaft 40 at two locations, one each abutting the external face of one of the two bearing plates. Sleeve 42 overlays the interior end of the threaded shaft 40 to protect the threads.

Reference is now made to FIG. 5, wherein it is seen that the upper section 14A, includes a central inwardly directed pointer 56 that is disposed in the upper part of the oval element and directed into slot 52. Element 14A also has a concave notch 54 therein vertically spaced from the pointer in the lower part of the oval element.

The two bearing plates 16, 20 are configured differently. The outer bearing plate 16 is generally rectangular, and has an aperture 16A spaced up slightly from its lower end for the receipt of the threaded shaft 40 as per FIGS. 2 and 4. The inner bearing plate 20 is of the same general dimension, has an aperture 20A, aligned with aperture 16A for the shaft 40, but it has chamfered upper corners, and an inwardly directed top flange 20F mounted normal to the plane of the plate, disposed toward the outer flange plate. This flange, 20F, best seen in FIG. 7 serves as a spacer member. As can be seen in various figures, the shaft 40 passes through both plates, and the plates can rotate independently on the shaft. The inner plate also includes a concave recess 20D, which matches the curvature of section 30H of the inner roller track plate 30, to permit the bearing 18, not seen in FIG. 6 to rest in the notch 54 with plate 20 in position disposed above section 30H. See FIG. 18 for a depiction of the bearing at rest.

Disposed between the two plates is a roller bearing 18, seen in FIGS. 3, 4 and 5 (in cutaway). This roller bearing 18, also rides on the threaded shaft 40 within the slot 52, of section 14A and is of a cross section slightly smaller than that of the slot 52.

Figure 8:
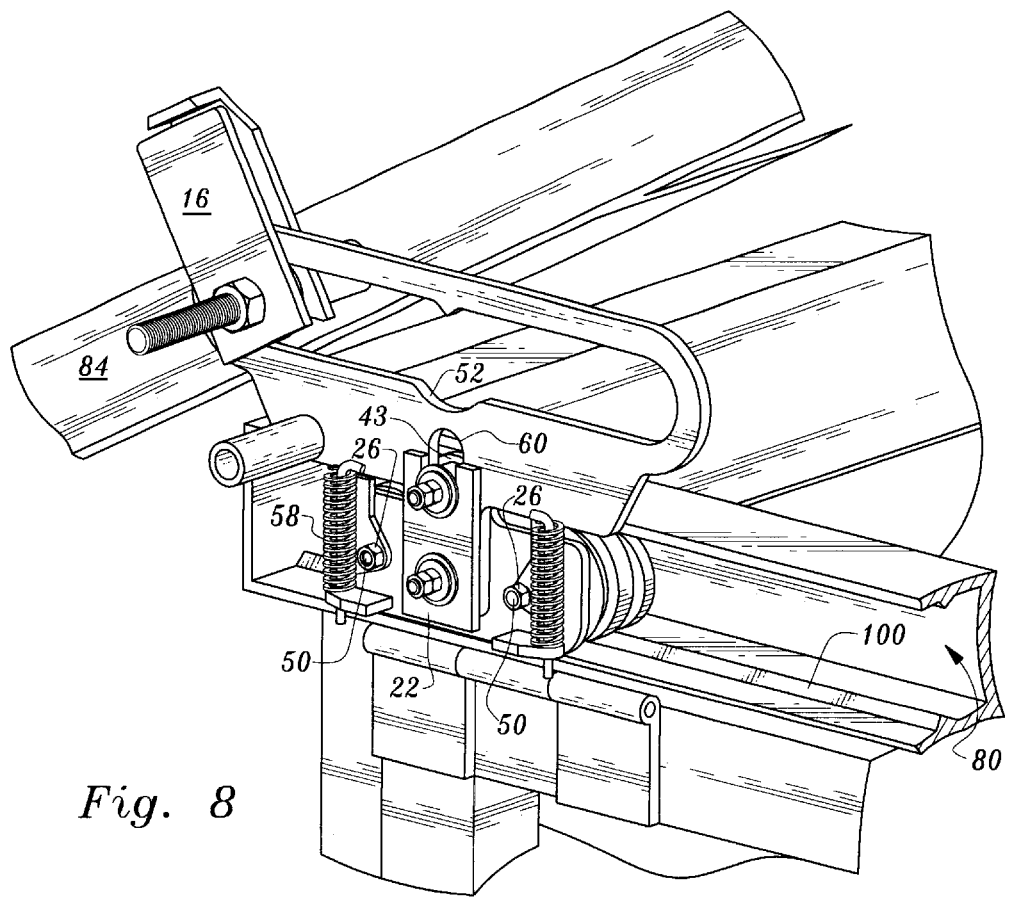
FIG. 8 is a zoomed out view showing the tank lid in an inclined elevated position attached to the first component of this invention.

As seen in FIGS. 2 and 8, outer spacer plate 22, which is a generally rectangular vertically disposed plate, includes a pair of vertically aligned bores 22A, through which pass a pair of bolts 38, seen best in FIG. 7, each of which bolts are retained by two washers, 48 and a pair of nuts 26. Bolts 38 which each carry a bearing are connected to permit the lowermost section of the SLLR,14C's vertical slot 60, to move relative to the fixed bearings carried by bearing bolts 38, as per FIGS. 2 and 7 upon the urging of the adjacent coil springs.

The discussion now turns to FIG. 5 wherein the inner side of the SLRA 12 is seen. The bolt heads of bolts 38 are seen to pass through suitable apertures in the inner roller plate 30. The plate 30 is a generally rectangular plate with the longer dimension being in a lateral disposition. The two lower corners are preferably radiused, and the plate 30 includes an upstanding hemi-spherical upper segment 30H, in the same vertical plane as the balance of the unit, through which one of the bolts 38 for retention of main roller plate 14 passes.

The inner roller track plate 30 also includes a pair of spaced bores, not seen, through which pass axle bolts 50 to be retained by nuts 26 without washers. See FIGS. 2, 7, and 9.

Note from FIGS. 2 and 4, among others, the feet 24 which are mounted at the lower edge of the inner roller track plate 30, and directed away from the plate and inwardly toward each other as well. Note particularly FIG. 2. Each foot 24 includes a vertical bore 28 for the mounting of a coil spring 58. Each spring 58 is placed upon an inverted L shaft 62, which shaft is simply disposed within the bore 28 at its lower end, while the upper end of the shaft is welded to the roller plate 14. See the detailed close-up view of FIG. 10, as well as FIG. 2 among others for these elements.

As noted in FIG. 5, a pair of laterally spaced V-groove casters 34 having aligned grooves 36 are mounted on spaced axle bolts 50, which bolts are disposed through the outer roller track plate 32 and the inner such plate 30, which pair retains these casters 34 in place. The outer roller track plate, is a flat horizontally disposed plate with radiused ends for cosmetic purposes. See also FIGS. 3 and 6.

Reference is made to FIG. 7, the bottom plan view, where the spacer washers 46 and 48, also mounted on the axle bolts 50, are seen separating the V-groove casters from the two roller track plates on the opposite sides of the casters. The axle bolts 50, per FIGS. 2 and 8 pass through the inner roller track plate 30 per FIG. 7, and are retained by double nuts 26.

The reader's attention is now directed to the second component of this invention, the spring lift lid roller or SLLR, 13, which component is employed in mirror image facing pairs on each end wall of the lid 84. Thus four of these SLLRs are employed with two of the SLRAs for movement and rotation of lid 84. While seen in FIGS. 1 and 2, specific reference is made to the close-up views of them in FIGS. 12 and 13.

Thus each SLLR 13, includes an angularly disposed, folded arched elongated U-shaped sheet metal plate 19 having a pair of upper aligned apertures 39U, and a pair of lower aligned ones 39L at each respective terminus of the arch. Through the upper aperture passes a mount bolt 29. This bolt 29 passes through the lid outwardly and is terminated by a lock washer,31 and nut 35 used in combination. This same combination of a washer and nut but designated 41 and 35 respectively are on the exterior end of the lower bolt 33 which retains the roller 37. See FIG. 12.

A generally right angle triangular flange 19F is integrally formed with and extends from the interior arm of the U-shaped plate 19. The 90° angle thereof is adjacent to the interior terminus of the U-shaped plate's "U". A small spacer segment 19FF extends normally to the flange 19F and is directed inwardly toward the lid. An aperture 43 at the distal end of flange 19F is for the attachment of coil spring 17 as per FIGS. 12 and 13.

A roller 37, is carried by a lower bolt 33, which bolt passes through a lower pair of aligned bores, 39L, which are also in said U-shaped plate, 19 but distant from the U-end. The threaded end of this bolt 33 carries a nut 35 and a spacer washer 41.

An upstanding teardrop metal segment 15 is welded or otherwise attached to the sidewall of the lid 84S, per FIG. 12. On this segment 15, an eyebolt 27 is attached, directed toward the U-shaped plate 19's arch. The coil spring 17, is attached at one end to the eyebolt 27 and at its other end to the flange 19F's aperture 43.

Prior to a discussion on how the 2 SLLRs 13, on each side wall 84S and the SLRA 12 cooperate to relocate and tilt the lid 84 of the container 76, the discussion will first relate to the disposition of the SLLRs and the SLRA. Thus reference to FIG. 12 shows that each SLLR is mounted to one end of the sidewall 84S of the lid 84. Thus for any one tank there are 4 SLLRS, two on the opposite extremes of each of the two sidewalls 84 of the lid, with each pair being mounted in a mirror image relationship. A review of FIG. 1 shows one SLLR 13, depicted positioned relative to an SLRA, 12.

As to mounting, a track 80 seen in FIGS. 1 and 2, as well as in FIGS. 8, 9, 10 and 11, serves as the receiver for the SLRA. The track 80 is a C-shaped channel disposed on the top of each of the sidewalls of the tank end 88, and it is welded into place such as at weld sites 100, (FIG. 8) to the container's end 88, upper edge, along the length thereof.

Figure 10:
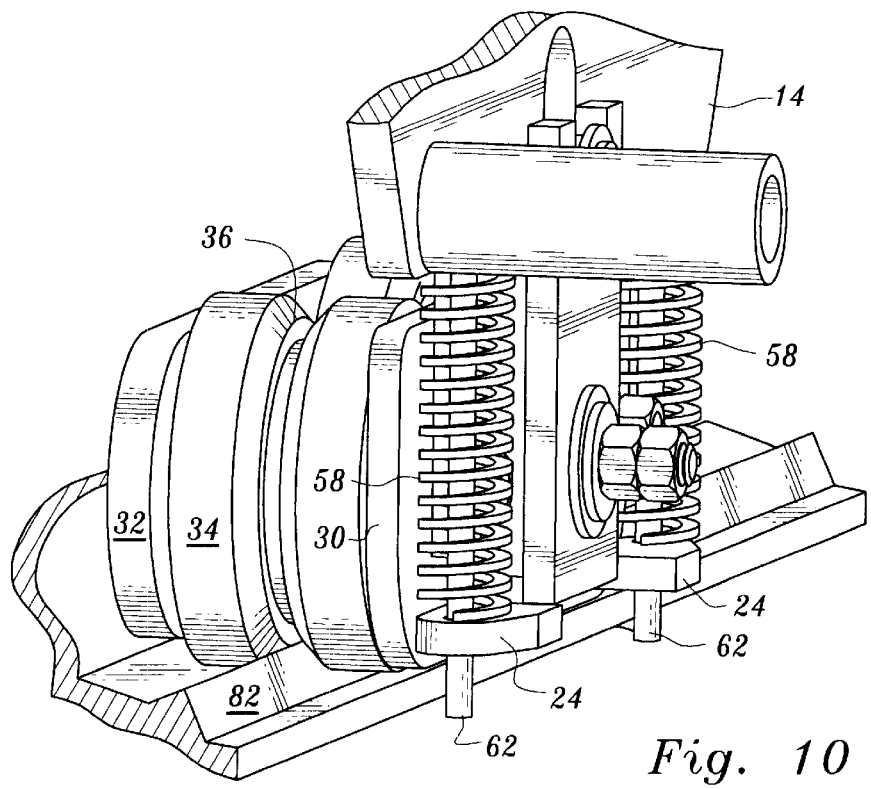
FIG. 10 is a left side close-up of a part of the first component of the apparatus of FIG. 2

The C-channel includes an upper surface 80A, a middle surface, 80B normal to both the upper and lower surfaces, and a lower surface, 80C, spaced from and parallel to the upper surface 80A. The track 80 is closed off by track ends 80E welded upright to the channel 88 as is seen in FIG. 8. Attached as by welding, braising or some other suitable means to the interior side of the lower surface 80C, is an inverted V-extrusion 82, that runs the length of the channel and is designated the lower track. The upper track of similar material designated 83 is the upper track of the dual track system. These extrusions are best seen in FIGS. 1 and 10. It is this inverted V 82, that fits into the V-groove caster 34's V-groove 36. Again reference is made to FIG. 10.

The V-groove casters 36 are disposed between the two inner and outer roller plates 32 and 34 of the SLRA as has been noted with respect to FIG. 7. Thus it is understood that the SLRA 12, rides via its casters on the V-extrusion between the two track ends 80E of the channel.

The sleeved end 42 of the threaded shaft 40 seen in various figures, is disposed into a central tubular portion 94 of a triangular plate 92 which plate is mounted at the midpoint of the side 84S of the lid 84. See FIG. 11. This is the connection between the SLRA 12, and the lid 84 for the lateral movement of the lid in conjunction with the moving of the SLLRs 13; and then for the ultimate pivoting of the lid 84 when the SLRA reaches the end of the track 80 as per the disposition as depicted in FIG. 8. The threaded shaft 40 connection to the SLRA passes through the two bearing plates 14, 16 as per FIGS. 8 and 9 to retain the roller bearing that rides in the racetrack slot as previously discussed.

Figure 9:
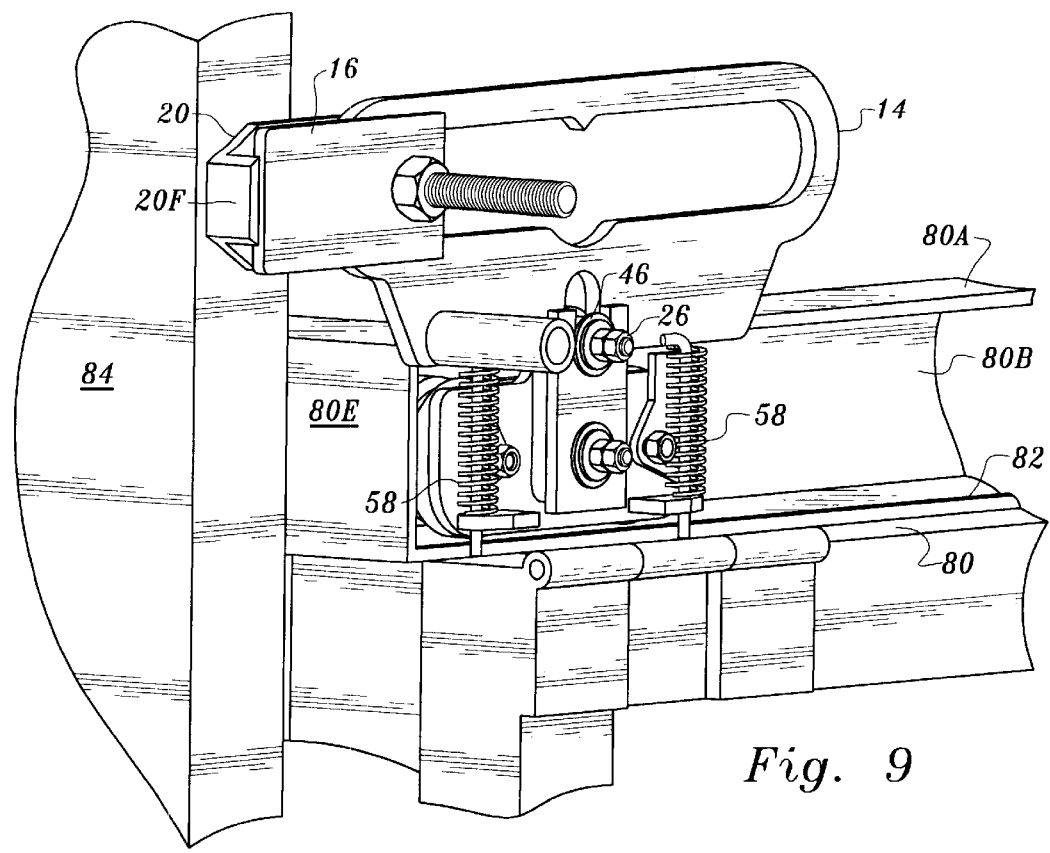
FIG. 9 is a view similar to FIG. 8 but from a slightly different vantage point and at a later moment in time, during an opening cycle than FIG. 8.

A contrast of FIGS. 1 and 8 shows the positioning of the SLRA at opposite extremes of the track 80, while FIGS. 9 and 11 shows the lid 84 pivoted. Reference to the figures also reveals that the component 13 rides on the exterior surface of the upper channel member 80A of the track 80.

OPERATION

Now that the components and the connections thereof have been set out the discussion moves to the opening, movement and ultimate tilting of the lid. A stylized time lapse drawing—without the intervening travel between the sides of the container—illustrates the lid's rotary action in its entirety, transpiring at both the left and right sides position of the container in FIG. 19. Of course rotation only transpires at one end at any one time.

The reader's attention is turned to FIGS. 2 and 8, not for the specific location of the lid 84, but to specifically note the presence of the vertical slot 60. Note further from FIG. 2, how the bearing plate 16 has its lower end below the racetrack slot, as the roller bearing 18—seen via the cutaway of FIG. 5, is disposed within the notch 54. Note also how the lid 84 is in close proximity to the container's walls upper edges, i.e., closed.

Reference is now again made to FIG. 5, wherein the slot 60 is not visible. There is no visibility because, when the lid is in position as for travel or prior to movement, the lid 84 is sealed to the edge of the container and so retained by at least one web tightener.

Figure 18:
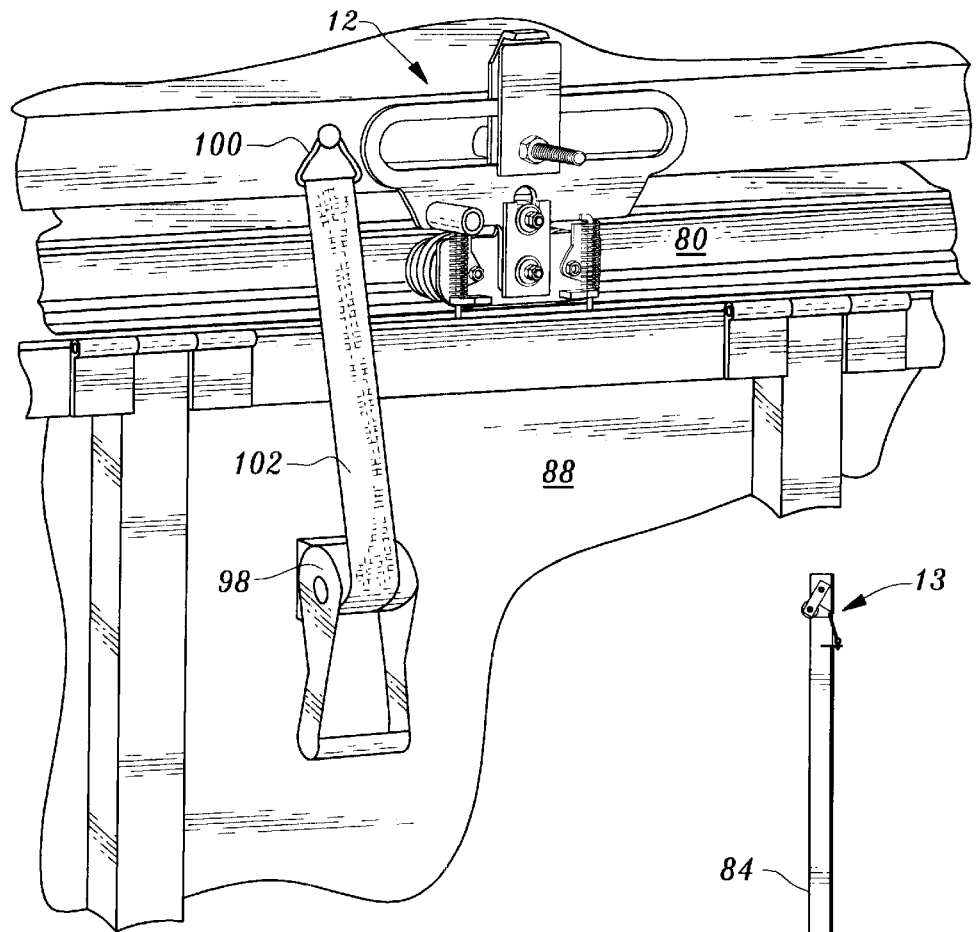
FIG. 18 is a close-up perspective view of a mobile tank and lid and a tie-down system used in conjunction therewith.

In FIG. 18, such a conventional web tightener 98 is seen mounted to the end wall of the container. A nylon webbing section 102, passes through a swivel latch 100 which webbing when tight holds the lid to the container. At least one such web tightener is found on each end of the container. When the webbing section 102 is tightened down, the two big coil springs, 58 seen best in FIG. 10, as well as in FIG. 8 and 9, are compressed and the slot 60 can be seen. But when the webbing 102 is released, the coil springs relax, and force the roller bearing out of the notch 54, into the elongated slot, such that the vertical slot 60 can no longer be seen, because the pins 38 per FIG. 5 have moved upwardly in the vertical slot 60.

Restated, in the at rest position, the pins 38 are toward the bottom of the vertical slot 60 and the slot is visible, while the coil springs 58 are under compression. But when the coil springs relax, the pins 38 rise, and the slot 60 becomes no longer visible. See FIG. 14 and 15 among others.

Figure 14:
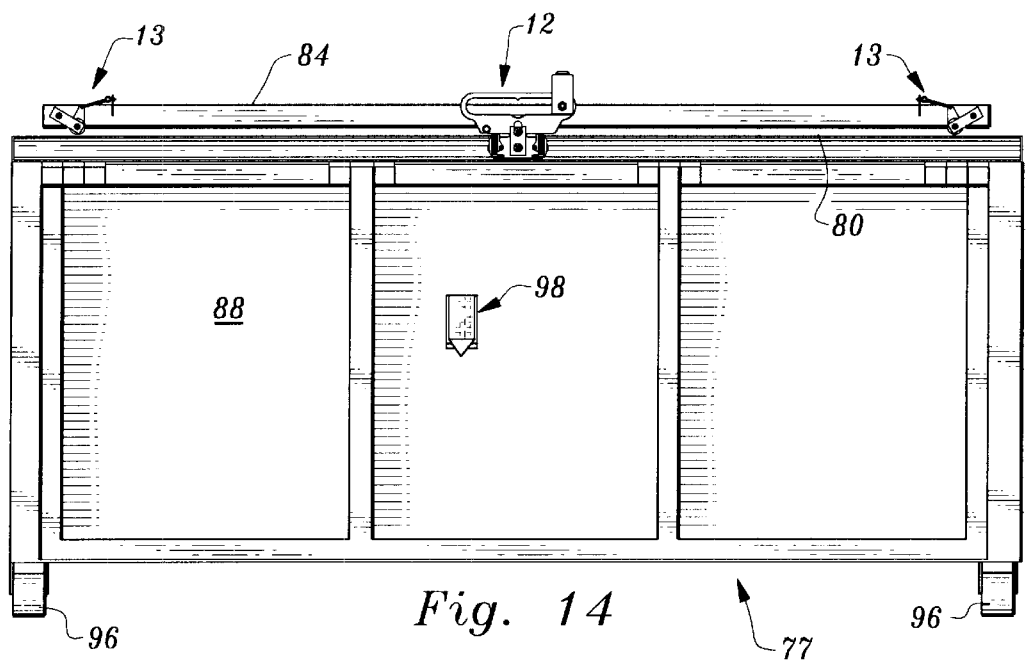
FIG. 14 is an end elevational view of a mobile tank with the apparatus of this invention mounted thereto.

In FIG. 14, the SLRA 12 is seen to have moved from its exact center position, slightly to the right. Note how both SLLR's 13's rollers 37 are still riding along the upper member, 80A. See also FIG. 1, which is a zoomed in view. Note the disposition of the roller bearing 18 situated between the plates 16 and 20, in that the three elements are at the far right of the racetrack slot 52.

Figure 15:
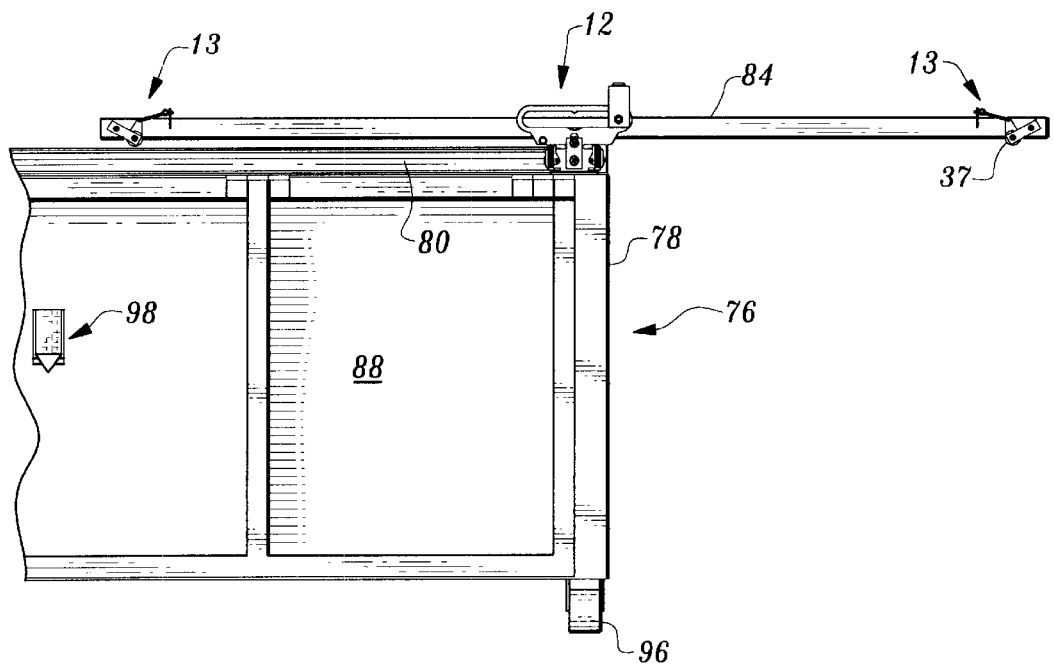
FIG. 15 is a view similar to FIG. 14 but wherein the lid and the first portion of the apparatus have been moved to the far right side of the tank.

In FIG. 15, a view at a point in time a few seconds later than the view of FIG. 14, one notes that the lid 84 overhangs the container 76 and that only one of the SLLR rollers 37 is still riding on the top surface of the upper member of the C-channel; namely, 80A, while one roller 37 is hanging in mid-air. But the V-casters have not as yet hit the track end 80E.

FIG. 8 would be the next point in time if the lid had been moving leftwardly rather than rightwardly as has been noted. However the action that transpires is the same, as if the lid had been moving rightwardly, given the understanding of FIG. 19 which shows that the action to the sides of the container is the same.

The casters impact the end 80E, and one spring 26 hangs out beyond the container. The connection to the lid via threaded shaft 40 between the plates 16, 20 now overhangs the side of the container. Gravity comes into play, and so we note how one end of the lid 84 dips down and the other end dips up. Reference is again made to FIG. 19. The tilting of the lid continues downwardly as can be seen in FIG. 9, and FIG. 11, until the lid assumes a generally vertical position with one end sticking up in the air. The lid is disposed beyond the edge of the container, so that the vertical positioning is readily achievable.

Figure 16:
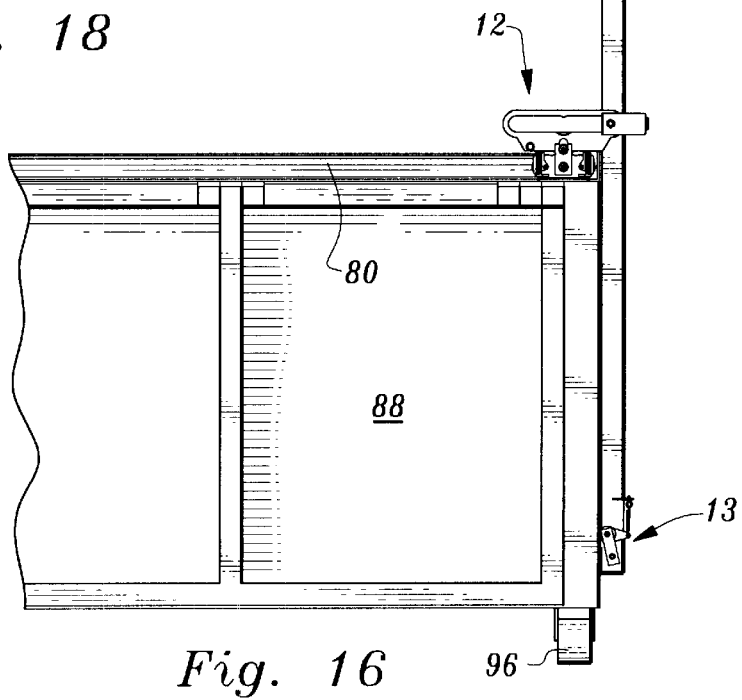
FIG. 16 is a left side elevational view of the lid interior and showing the first portion of the apparatus attached thereto.

An end view, showing the lid 84 absolutely upright on the right side of the container is depicted in FIG. 16. Note the same relative positioning of the other elements. One spring 26 is shown rightwardly beyond the container. Such positioning is also noted from FIG. 17 wherein the viewer's vantage point is from on the side of the container with the lid having moved sidewardly and being in the air, as opposed to the viewer being on the end of the container, as in FIG. 16.

Returning momentarily to FIG. 1, wherein two of the trio of hinges 90 are seen. These are present only at one end of the tank and are attached to the underside of the track carrying the lid. These hinges are fixed relative to the track, but move with the bottom opening door to permit the unloading of the tank as when hoisted front end up as is known in the art. Thus dumping of the contents of the tank, without having to use shovels, vessels or other implements—depending on nature of the contents—to remove the stored material can easily be accomplished. On the opposite side, suitable spacers—not seen—may be present instead of the hinges, 90 in order to have uniform spacing of the lid and track from the tank's upper edge, ie. to keep the lid level. Other means to achieve a level lid are also known.

Figure 22:
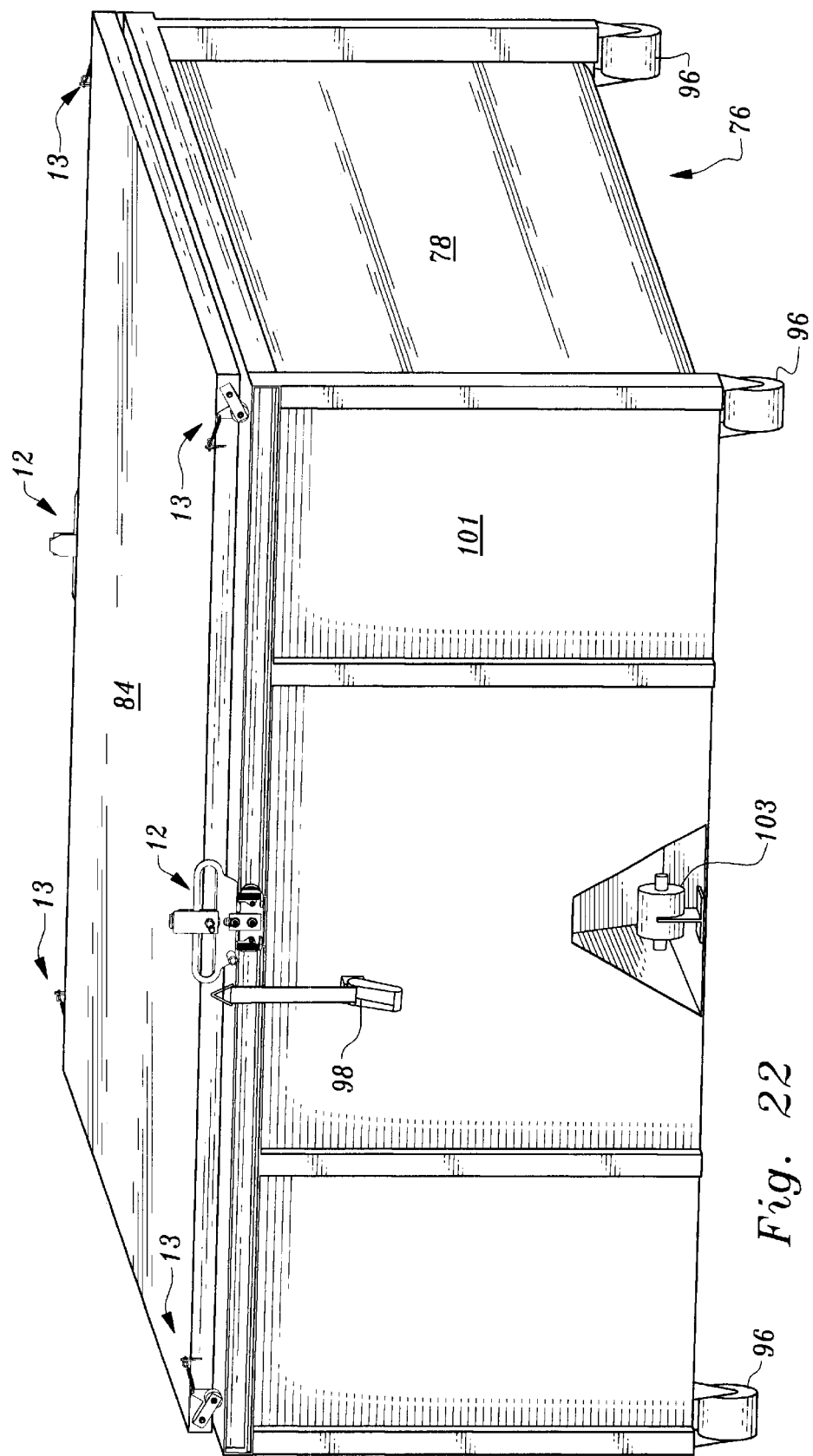
FIG. 22 is an perspective view of the forward or non-opening end of the tank employing this invention.

FIG. 22 is present to help emphasize the fact that the invention of this application is used in pairs, at both ends of the apparatus. Thus FIG. 22 is seen to be the head end of a tank employing the instant invention. Note the distinct absence of a pivoting door used for disposal of tank contents upon lifting of the tank onto a real or virtual incline. Of course the track is resent on the forward end and is the same as the track described with respect to the rear end of the tank.

It is seen that we have disclosed a tank lid retention and removal apparatus that unseals the lid from a mobile tank when the web tighteners are released. When our apparatus is employed, movement of the lid does not drag across the container top edges, but rather the lid rolls across the top edge of the container until such time as more than half of the lid is extended beyond the tank, either side of the tank. At that time, gravity takes over and the lid rotates about the mounting axis to a vertical position for material placement therein.

The SLRA is returned toward the center after the dipped end of the lid is manually raised, to help the lid return to a horizontal disposition, which action is followed by manual urging of the lid horizontally toward the interior of the tank. Once the lid is aligned with the edges of the tank the web tightener and its web can be redeployed. During the movement just described the SLRA will move from the edge 80E inwardly toward the middle of the track 80. First one of and then the second of the SLLR's rollers will roll along the top wall exterior surface 80A of the channel forming the track.

Note again that entry into the tank is had through the lid of this invention, but disposal of the tank's contents takes place through the gate or door built into the rear of the tank. When full, the tank can be manually evacuated, or be subject of machine assisted evacuation, —vacuum hose—as may be desired. The hinged door is again lowered, sealed and the covered tank is again ready for use.

It is seen that one person can readily and quickly move the lid from these mobile tanks, a feat that can NOT be accomplished using prior art lid attachment means, which are usually just a pair or more of hinges.

The operation of the invention described above is applicable whether one employs the SLRA 12 described supra, which is less preferred, or that component is replaced by the more preferred SLRA 112 to be discussed infra. In the discussion to follow, parts which are the same as part previously described will retain the earlier used number designations. However, where a part is similar to a previously discussed part in function but not in appearance the two digit reference number will not be retained, instead 100 is added to the designator. Where the part is the same as is employed in the less preferred embodiment earlier discussed, its original numeric designator is retained.

Figure 20:
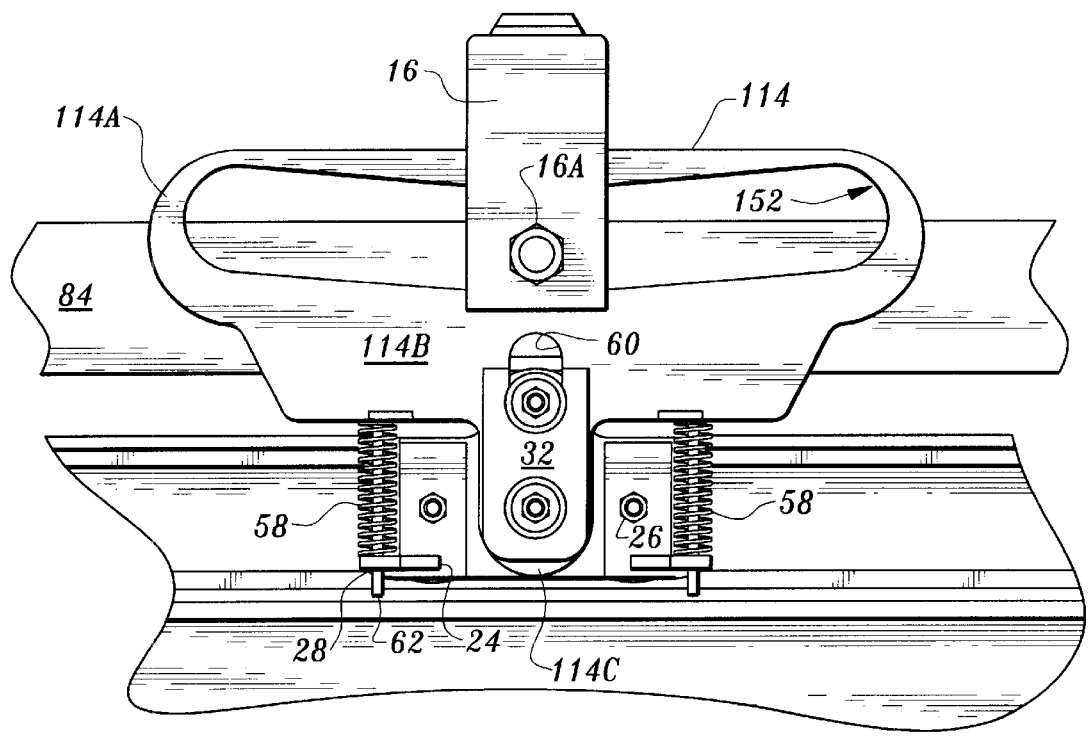
FIG. 20 is a close-up elevational view of an alternate version of one component of this invention; namely, the component shown in FIG. 2. This variant is labeled 114.
Figure 21:
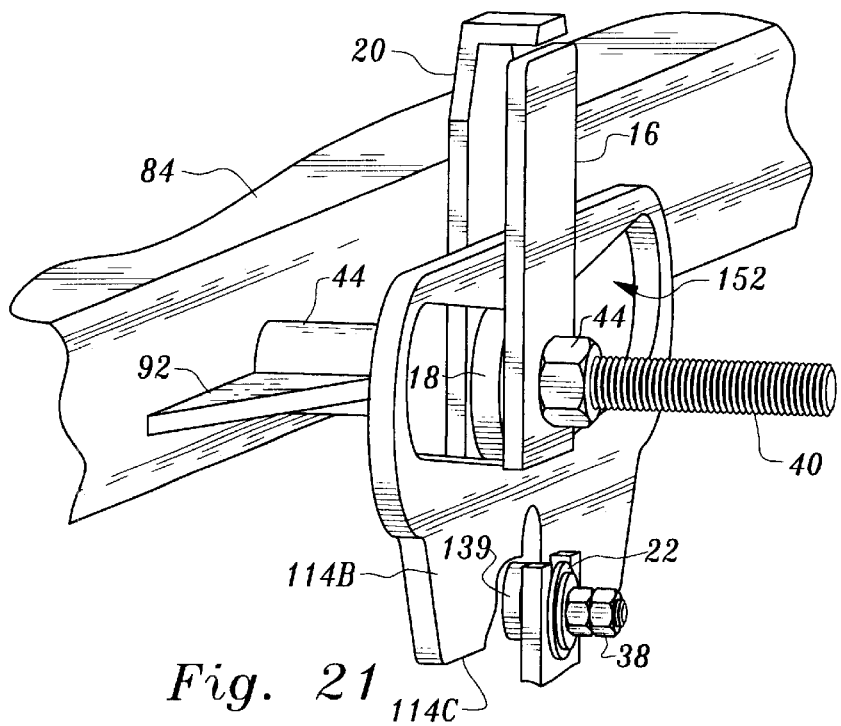
FIG. 21 is a side close-up perspective of the component shown in FIG. 20.

The SLRA 112 seen in FIG. 20 is an alternative improved embodiment to the one previously discussed. This SLRA 112 has a main element which also is an elongated main roller plate, designated 114, and which has three integrated sections of the same thickness but different lengths. The sections are 114A, the upper; 114B, the middle and 114C the lower section. Reference is made particularly to FIGS. 20 and 21. Section 114A, is a modified racetrack shape section of the longest dimension, and it has a boomerang shaped slot 152 therein. Contrast this shape of the preferred embodiment to the racetrack shape of section 14A earlier discussed and the slot found therein. While referred to as a boomerang, the slot 152 is a lazy V-shaped slot, with the inclination of each "arm' of the slot being within the range of 7 to 10 degrees above the horizontal.

Section 114B is a solid plate of slightly less extension and which has therein part of a vertical central slot, 60 for the receipt and passage of the vertically spaced mounting bearing bolts 38, each of which bolts has a bearing 139 thereon, and which are seen best in FIG. 21. These bearings, 139 permit unencumbered vertical movement of the main bearing plate 14 between the spacer plate 22 and the inner roller track plate 30.

The third section is a vertically directed central section 114C, in FIG. 20. This third section 114C is integral to the second section and contains the lower part of the rounded end vertical slot 60 and is itself preferably arcuate at the bottom. The upper area of the rounded end vertical slot 60 can also be seen in FIG. 20.

A pair of bearing plates, the outer bearing plate 16 and the inner bearing plate 20 are spaced horizontally from each other by a bearing, 18 per FIG. 21, and each of said bearing plates is disposed on the exterior opposite face of the SLRA 114. The spacer plate 22 as seen also in FIG. 20, includes a lower central bore and an upper cradle recess in which are disposed the bearing 43 carried by bearing bolts 38.

A threaded shaft 40 passes through aligned throughbores in each roller plate, in the manner per FIG. 4 and is secured by a pair of nuts 44, as shown for this embodiment in FIG. 21, one each abutting the external face of one of the two bearing plates, 16 and 20. Sleeve 42 overlays the interior end of the threaded shaft 40 to protect the threads. This sleeved end is connected to triangular plate 92, preferably by insertion into a tubular receiver attached to said triangular plate, and acts in the same manner as the sleeved end 42 discussed supra with respect to the discussion pertaining to FIG. 11 for the connection to the lid.

In all other respects the SLRA designated 112 is the same as component 12. Thus, for example, the coil spring mounts 62 are still welded on at the top and inserted into apertures in the respective foot to carry a coil spring 58, to permit the springs 58 to act in a manner to dampen the vertical lift of the plate 114.

The SLRA 112 just described in detail with the boomerang slot 152 is the preferred version of the component. The primary reason is that it is easier to manufacture, thus achieving a cost savings during manufacture. Also by having the lower surface of the slot angled downwardly as shown, gravity aids in the central disposition of the bearing 18; and the removal from the less preferred depression opposite the pointer is also more difficult to achieve effort-wise, than is a mere angled travel based upon the boomerang angled geometry of the slot 152 of the more preferred embodiment.

FIG. 22 is included herein to help the reader comprehend the fact that the invention is utilized at both ends of the tank. All of the views showing the tank have been of the rear end, 77 (see FIG. 14) where the trap or hinged door is placed. Here at the forward end 101 of the tank, there is no hinged door present, rather only a hitch or other similar means 103 to enable the tank or container 76 to be relocated.

It should be pointed out to the reader that tanks of this nature are loaded through the top, but are emptied through the hinged door shown to be in the rear of the tank. Indeed, while the tank depicted in the drawings here has a bottom opening rear door, many manufacturers choose to have the "trap door', be side opening. The hinge location dictates the mode of opening. Top hinged means bottom opening. Of course appropriate seals are employed to retain the contents. However time need not be spent on the details of the unloading door, since the unloading door forms no part of the instant invention. Typically a roll-off hoist can be utilized to raise the mobile tank's front end into the air for dumping. Truck mounted roll-off hoists are available in the marketplace from various manufacturers, including the assignee of this application.

Since certain changes may be made in the above described apparatuses without departing from the scope of the invention herein involved, it is intended that all matter contained in the above description and shown in the accompanying drawings shall be interpreted as illustrative and not in a limiting sense.

We claim:

1. An apparatus used in spaced pairs, mounted one on each of the opposite ends of a mobile tank, which tank is of an open top box general configuration, having a removable lid thereon, said apparatus also being attached to the lid of the tank, which apparatus comprises:

(a) a dual level track system having an upper level and a lower level, said track system being mounted at the top of each end of the mobile tank and extending from a first side of the tank to a second side of the tank, the lower level being capped off by track ends;

(b) a spring lift roller assembly attached to the tank lid and having casters thereon and positioned for travel on said tank's track's lower level between the track ends located at the first side and the second side of said track;

(c) a pair of opposed spring lift lid rollers adapted for travel on the upper level of said track, utilized with each spring lift roller assembly, one of said rollers attached to each side of the same end of the lid, said roller capable of movement from on said track to beyond the edge of the respective side of tank, off said track;

whereby when said spring lift roller is moved along the lower level of said track to one of said track ends, one of said spring lift rollers will extend beyond the edge of that respective side of the tank's upper track level, such that as the roller assembly moves toward impact with the track end, the spring lift roller located at the end of the lid in the direction of travel of the roller assembly will roll off the track upper level, and then move arcuately downward, and the lid will rotate upward from a generally horizontal position to a generally vertical position.

2. In the apparatus of claim 1 wherein the spring lift roller assembly comprises an elongated main roller plate, with a quadra chamfered rectangular shaped upper section having an elongated slot therein;

outer and inner bearing plates, spaced from one another by being mounted on opposite sides of the main bearing plate;

a roller bearing disposed between said inner and outer bearing plates and disposed within said slot of said main roller plate;

a threaded shaft passing through said inner and outer plates and said bearing for disposition in said lid;

an inner roller track plate having a pair of spaced opposed feet thereon is moveably connected to said main roller plate and fixedly connected to a front spacer plate with said main roller plate disposed there between;

a pair of casters, spaced from one another and adapted for travel on the lower track of said dual track system, are mounted on the inner roller track plate.

3. The apparatus of claim 2 further including coil springs one end of each is disposed in said feet of said inner roller track plate, and the other end of each is connected to said main roller plate.

4. The apparatus of claim 3 further including an outer roller track plate, connected to said inner roller track plate, wherein the casters are V-groove casters disposed between said inner and outer roller track plates.

5. In the apparatus of claim 1 wherein the spring lift rollers, each comprise a folded arched elongated U-shaped plate having a pair of upper aligned apertures and lower aligned apertures respectively at each terminus of the arch, said U-shaped plate also having a flange thereon extending from said U-shaped plate;
- a bolt carrying a roller is disposed through said lower pair of aligned apertures;
- a bolt for mounting to the tank lid passing through the upper of said aligned aperture pairs;
- a coil spring mounted to said flange and to a boss, which boss when mounted extends outwardly from said tank lid.

6. In the apparatus of claim 1 wherein the spring lift roller assembly has a central notch in which a bearing can rest.

7. In the apparatus of claim 6, wherein the spring lift roller assembly includes a pair of V-groove casters on spaced axles for movement upon a track that would be mounted to said tank.

8. In the apparatus of claim 7 wherein the spring lift roller assembly also includes a pair of spaced vertically disposed coil springs mounted on one end to the main roller plate.

9. In the apparatus of claim 1 wherein the spring lift roller assembly comprises an elongated main roller plate, with a modified quadra chamfered rectangular shaped upper section having a boomerang shaped slot therein;
- outer and inner bearing plates, spaced from one another by being mounted on opposite sides of the main bearing plate;
- a roller bearing disposed between said inner and outer bearing plates and disposed within said slot of said main roller plate;
- a threaded shaft passing through said inner and outer plates and said bearing for disposition in said lid;
- an inner roller track plate having a pair of spaced opposed feet thereon is moveably connected to said main roller plate and fixedly connected to a front spacer plate with said main roller plate disposed there between;
- a pair of casters, spaced from one another and adapted for travel on the lower track of said dual track system, are mounted on the inner roller track plate.

10. The apparatus of claim 9 further including coil springs one end of each of which is disposed in said feet of said inner roller track plate, and the other end of each of which is connected to said main roller plate.

11. An apparatus used in spaced pairs, mounted one on each of the opposite ends of a mobile tank, which tank is of an open top box general configuration, having a removable lid thereon, said apparatus also being attached to the lid of the tank, which apparatus comprises:
  (a) a dual level track system having an upper level and a lower level, said track system being mounted at the top of each end of the mobile tank and extending from the first side of the tank to the second side of the tank, the lower level being capped off by track ends;
  (b) a spring lift roller assembly having a threaded shaft, which shaft is attached to the tank lid, said shaft being disposed through inner and outer bearing plates, with a bearing there between;
    said spring lift roller assembly having a main bearing plate with a with a slot therein in which said bearing travels, said spring lift roller assembly also having casters thereon which casters are positioned for travel on said tank's track's lower level between the track ends;
  (c) a pair of opposed spring lift lid rollers adapted for travel on the upper level of said track, associated with each spring lift roller assembly, one of said rollers attached to each side of the same end of the lid, said roller capable of movement from on said track to beyond the edge of the respective side of tank, off said track;
    whereby when said spring lift roller is moved along the lower level of said track to a track end, one of said spring lift rollers will extend beyond the edge of that respective side of the tank's upper track level, such that as the roller assembly moves toward impact with the track end, the spring lift roller located at the end of the lid in the direction of travel of the roller assembly will roll off the track upper level, and then move arcuately downward, and the lid will rotate upward from a generally horizontal position to a generally vertical position.

12. An apparatus used in spaced pairs, mounted one on each of the opposite ends of a mobile tank, which tank is of an open top box general configuration, having a removable lid thereon, said apparatus also being attached to the lid of the tank, said tank also including a dual level track system having an upper level and a lower level, said track system being mounted at the top of each end of the mobile tank and extending from the first side of the tank to the second side of the tank, the lower level being capped off by track ends; which apparatus comprises:
  (a) a spring lift roller assembly attached to the tank lid and having casters thereon and positioned for travel on said tank's track's lower level between the track ends located at the first side and the second side of said track;
  (b) a pair of opposed spring lift lid rollers adapted for travel on the upper level of said track, associated with each spring lift roller assembly, one of said rollers attached to each side of the same end of the lid, said roller capable of movement from on said track to beyond the edge of the respective side of tank, off said track;
    whereby when said spring lift roller is moved along the lower level of said track to a track end, one of said spring lift rollers will extend beyond the edge of that respective side of the tank's upper track level, such that as the roller assembly moves toward impact with the track end, the spring lift roller located at the end of the lid in the direction of travel of the roller assembly will roll off the track upper level, and then move arcuately downward, and the lid will rotate upward from a generally horizontal position to a generally vertical position.

13. In the apparatus of claim 12 wherein the spring lift roller assembly comprises an elongated main roller plate, with a race track shaped upper section having an elongated slot therein;
- outer and inner bearing plates, spaced from one another by being mounted on opposite sides of the main bearing plate;
- a roller bearing disposed between said inner and outer bearing plates and disposed within said slot of said main roller plate;
- a threaded shaft passing through said inner and outer plates and said bearing for disposition in said lid;
- an inner roller track plate having a pair of spaced opposed feet thereon is moveably connected to said main roller plate and fixedly connected to a front spacer plate with said main roller plate disposed there between;

a pair of casters, spaced from one another and adapted for travel on the lower track of said dual track system, are mounted on the inner roller track plate.

14. In the apparatus of claim 12 wherein the spring lift lid rollers, each comprise a folded arched elongated U-shaped plate having a pair of upper aligned apertures and lower aligned apertures respectively at each terminus of the arch, said U-shaped plate also having a flange thereon extending from said U-shaped plate, a bolt carrying a roller is disposed through said lower pair of aligned apertures;

a bolt for mounting to the tank lid passing through the upper of said aligned aperture pairs;

a coil spring mounted to said flange and to a boss, which boss when mounted extends outwardly from said tank lid.

15. In the apparatus of claim 12 wherein the spring lift roller assembly comprises an elongated main roller plate, with a modified quadra chamfered rectangular shaped upper section having a boomerang shaped slot therein;

outer and inner bearing plates, spaced from one another by being mounted on opposite sides of the main bearing plate;

a roller bearing disposed between said inner and outer bearing plates and disposed within said slot of said main roller plate;

a threaded shaft passing through said inner and outer plates and said bearing for disposition in said lid;

an inner roller track plate having a pair of spaced opposed feet thereon is moveably connected to said main roller plate and fixedly connected to a front spacer plate with said main roller plate disposed there between;

a pair of casters, spaced from one another and adapted for travel on the lower track of said dual track system, are mounted on the inner roller track plate.

16. An apparatus used in pairs, each formed of two components, a spring lift roller assembly, and a pair of spring lift lid rollers, all of which are attached to a mobile tank lid; the roller assembly being mounted at about the midpoint of the depth of the lid by a pivotable bearing plate, disposed upon threaded shaft which shaft also carries a roller bearing;

one of the spring lift lid rollers is mounted at each of the distal and proximal ends of the lid equally spaced from the spring lift roller assembly mounting to said lid;

said spring lift roller assembly being disposed on and confined to a track and being adapted to move generally horizontally from a central position on said track in a desired direction, to one side or the other of the tank;

said roller assembly including a slotted main bearing plate adapted to receive a roller bearing, said main bearing plate being adapted for vertical movement;

said lid rollers simultaneously moving in the same direction, during the travel of the spring lift roller assembly, and when the roller assembly has reached its maximum travel point, the bearing plate attached to and forming part of the roller assembly rotates such that the lid now overhanging the tank's sidewalls, is in a position to and does rotate around the roller bearing of each roller assembly due to gravity, to open the access to the tank's content and the lid assumes a generally vertical position, having moved from an original horizontal disposition and said spring lift lid rollers being in a position off the tank when the lid overhangs the tank's sidewalls.

17. In the apparatus of claim 16 wherein the spring lift lid rollers ride on their own track disposed vertically above the spring lift roller assembly's track.

* * * * *